Feb. 10, 1959 R. P. STONE 2,873,404
MEANS FOR ELIMINATION OF LOSS OF CONTRAST
IN DIRECT VIEW STORAGE TUBES
Filed May 28, 1957
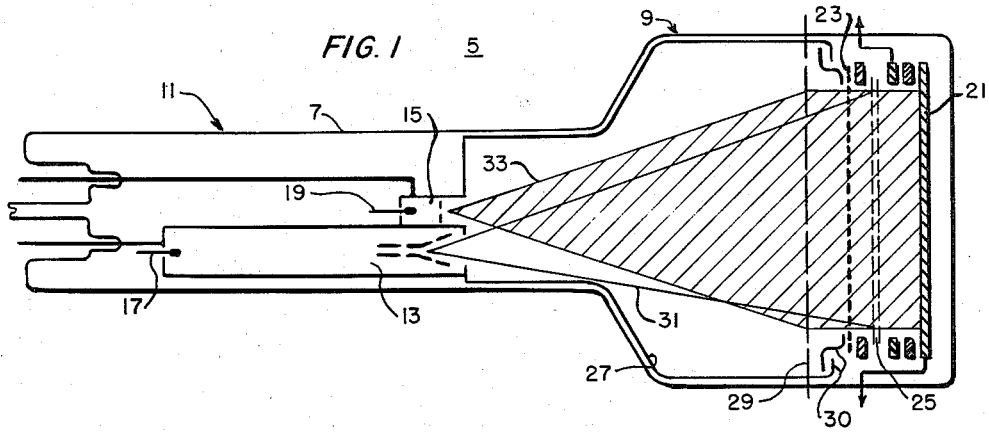
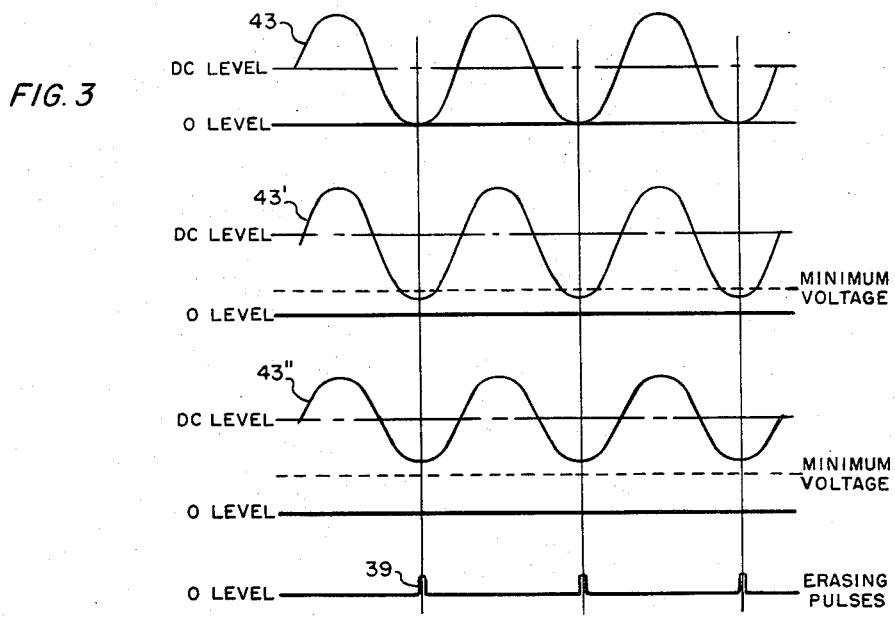
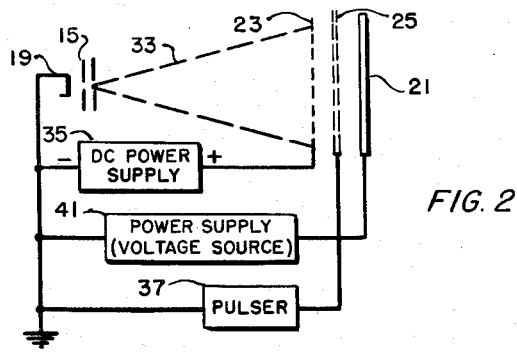
INVENTOR,
ROBERT P. STONE.
BY
Harry M. Saragovitz
ATTORNEY.

United States Patent Office 2,873,404
Patented Feb. 10, 1959

2,873,404

MEANS FOR ELIMINATION OF LOSS OF CONTRAST IN DIRECT VIEW STORAGE TUBES

Robert P. Stone, Lancaster, Pa., assignor to the United States of America as represented by the Secretary of the Army Application May 28, 1957, Serial No. 662,308

8 Claims. (Cl. 315—12)

The present invention relates to direct view storage tubes wherein stored information is erased and more particularly to a direct view storage tube comprising means for eliminating the loss of contrast resulting in the picture due to the flashes occurring during the erasing interval.

In the normal operation of a direct view storage tube the viewing gun may be used for overall erasure of the stored information. This is accomplished by shifting the potential of the storage layer positive, or the viewing gun cathode potential negative, to permit electrons to land on the storage layer. However, this method of erasure permits the passage of electrons through the storage grid openings to the luminescent screen causing a bright flash during the erase time. If repetitive erasure is used, as by pulsing the storage layer backplate, a serious loss of contrast may result since the picture under observation would be diluted by the flashes during erasure.

In the particular direct view storage tube which will be described herein and which utilizes the invention as will be described, positive pulses of appropriate amplitude, width, and repetition rate are applied to the storage grid backplate to erase the stored information at the desired rate. New information is simultaneously added by the writing gun, stored, and displayed. Further, in this type of direct view storage tube a loss of contrast will result, or more precisely, the black will seem less black, because of the bright flashes during the existence of the erasing pulses. This loss of contrast could be eliminated by switching off the luminescent screen voltage during each erasing pulse; but this is a difficult high voltage problem.

To eliminate the undesirable effects stated above, this invention, instead of utilizing the usual constant D. C. voltage, applies to the luminescent screen a cyclically varying voltage with a period equal to that of the erasing pulse.

An object of the present invention is to provide an improved system for erasing electrical data in a direct view storage tube.

Another object of the present invention is to provide in the operation of a direct view storage tube a simple means to eliminate the loss of contrast due to the overall repetitive erasure.

The exact nature of this invention as well as other objects and advantages thereof will be readily apparent from consideration of the following specification relating to the annexed drawings in which:

Figure 1 is a sectional view of a direct view storage tube with respect to which the present invention will be described;

Figure 2 shows diagrammatically the invention as applied to a direct view storage tube; and Figure 3 shows the phase relationship between the erasing pulses and cyclically varying voltage.

Referring now to the drawings, wherein like reference characters designate like or corresponding parts throughout the several views, there is shown in Figure 1 a direct view storage tube 5 comprising a sealed envelope 7 of glass, or the like, having an enlarged, substantially cylindrically shaped portion 9 merging with a substantially cylindrically shaped neck portion 11. Within the neck portion 11 of the tube envelope 7 are a first electron gun structure (writing gun) 13 for developing an electron beam and a second electron gun structure (viewing gun, flood gun, or erasing gun) 15 for emitting a flood of electrons. Writing gun 13 has a cathode (electron source) 17 at a potential of −1 to −5 kv., and viewing gun 15 has a cathode (electron source) 19 near zero potential. Within the cylindrical portion 9, transverse to the axis of envelope 7, at an end opposite from where the neck portion 11 merges, and in parallel planes are luminescent (phosphor) screen 21, furthest from the gun structures 13 and 15; collector grid 23, nearest to gun structures 13 and 15; and storage grid 25, contained between luminescent (phosphor) screen 21 and collector grid 23.

A portion of the inner surface of envelope 7 has a conductive coating 27 thereon, which is at a potential from 0.2 to 1 kv., to aid in focusing the electrons emitted by flood gun 15.

A collimated plane 29 is the principal plane of the electron-optical lens of the primary viewing beam. The collimator is designated by reference numeral 30.

The particular direct view storage tube shown in Figure 1 operates in a conventional manner. Writing is accomplished by applying an input signal to the control grid of writing gun 13 while storage grid 25 is simultaneously scanned with writing beam 31 by a conventional scanning means (not shown in Figure 1); and reading may be accomplished simultaneously with writing by flooding the entire storage grid 25 with a collimated beam (viewing beam) 33 of primary electrons from viewing gun 15.

Figure 2, showing portions of direct view storage tube 5 (Figure 1) and the external circuit therefor, will be used in describing the erasing operation of direct view storage tube 5. A D. C. power supply 35 (1–5 kv.) is connected between collector grid 23 and cathode 19. Cathode 19 is connected to ground. A pulser 37, which supplies positive erasing pulses 39, depicted in Figure 3, is connected between storage grid 25 and ground. Typical values for the erasing pulses are pulse repetition rate, 1,000 pulses per second; pulse length, 2 microseconds; and pulse amplitude, 5 volts. It should be noted that the decay time with pulse erasure is inversely proportional to the product of pulse repetition rate and pulse length. Thus either of these factors may be varied for a simple control of the decay time. The typical values given above result in a decay time of about 15 seconds. The amplitude of each erasing pulse should be equal to the length of the control characteristic, i. e., the difference in storage grid surface potential between saturation brightness and cutoff.

A voltage source 41 (shown in Figure 2) is connected between luminescent (phosphor) screen 21 and ground. This voltage source 41 supplies a cyclically varying voltage 43 (depicted in Figure 3) having a period equal to that of the erasing pulses 39.

By this invention the usual constant D. C. voltage applied to luminescent (phosphor) screen 21 is replaced by a cyclically varying voltage 43 (shown in Figure 3) having a period equal to that of the erasing pulses 39. The phase of this cyclically varying voltage 43 is adjusted so that the cyclically varying voltage 43 will be at its minimum value (zero) each time an erasing pulse occurs on storage grid 25. Thus, the electrons, which had previously brightly illuminated luminescent (phosphor) screen 21 during the erase pulse intervals, are repelled by the cyclically varying voltage 43 since it is at its minimum value (zero) at these times. These electrons are returned to the storage grid 25 and to the collector grid 23.

A simple embodiment of the invention would be to superimpose a sinusoidal ripple voltage (cyclically varying voltage) on the luminescent screen power supply (voltage source). This ripple voltage has its frequency set by the power supply source frequency from which it is derived. Therefore, the erasing pulse repetition frequency, which is arbitrary, should be made equal to the fixed ripple frequency.

Other easily obtained waveshapes, such as unfiltered half or full wave rectifier outputs, could be used for the luminescent screen voltage source in place of the usual power supply.

With a tube having a non-aluminized phosphor screen it is necessary for the cyclically varying voltage 43 (Figure 3) to swing to zero for complete elimination of loss of contrast when the erasing pulse exists. The reason for this is that any positive voltage on the phosphor screen will result in a slight illumination thereon during the existence of the erasing pulses. Thus, with a nominal D. C. value of phosphor of 5 kv., the cyclically varying voltage would swing from 0 to 10 kv. This is admittedly a large amplitude for "ripple," but could be approached with an unfiltered rectifier output.

With a tube having an aluminized phosphor screen it is necessary that the cyclically varying voltage 43' (Figure 3) swing below the voltage at which electrons can penetrate the aluminum layer for complete elimination of loss of contrast. The electron penetration voltage of the aluminum layer is depicted as the dashed line (minimum voltage) in Figure 3. In a typical case this might be 3 kv. For a nominal D. C. value of 5 kv., the cyclically varying voltage would then swing between approximately 3 kv. and 7 kv., assuming a sine wave ripple.

The examples given above illustrate how the complete elimination of loss of contrast can be obtained. It should be noted, however, that the peak-to-peak value of the cyclically varying voltage need not be as great as indicated in the above examples to secure a substantial improvement in contrast. This is because the light output from a phosphor varies as at least the square of the voltage, so that any reduction of the phosphor voltage during the erasing pulse duration will produce a more than proportionate improvement in contrast. Therefore, the contrast will be substantially improved if the amplitude of the cyclically varying voltage 43", as shown in Figure 3, is such that the voltage on luminescent (phosphor) screen 21 swings downward during the erasing pulse. To maintain highlight brightness the maximum voltage may swing above the usual D. C. operating level.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A direct view storage tube comprising an electron gun operating as an erasing gun; a luminescent screen; a storage grid adjacent said luminescent screen and substantially parallel thereto, said storage grid being closer to said erasing gun than said luminescent screen; a pulser connected between said storage grid and ground, said pulser supplying erasing pulses during the operation of said erasing gun; and a cyclically varying voltage source connected between said luminescent screen and ground, said cyclically varying voltage source generating a cyclically varying voltage having a period equal to that of said erasing pulses, said cyclically varying voltage being adjusted in phase so that the most negative portions of said cyclically varying voltage are coincident in time with said erasing pulses.

2. A direct view storage tube comprising an electron gun having a cathode, said electron gun operating as an erasing gun; a luminescent screen; a storage grid adjacent said luminescent screen, said storage grid being substantially parallel to said luminescent screen, said storage grid being closer to said erasing gun than said luminescent screen; a pulser electrically connected between said storage grid and said cathode, said pulser supplying positive erasing pulses to said storage grid during the operation of said erasing gun; and a cyclically varying voltage source electrically connected between said luminescent screen and said cathode, said cyclically varying voltage source generating a cyclically varying voltage having a period equal to that of said erasing pulses, said cyclically varying voltage being adjusted in phase so that it will be at its most negative value each time an erasing pulse occurs.

3. A direct view storage tube comprising an electron gun having a cathode, said electron gun operating as a viewing gun and erasing gun; a luminescent screen; a storage grid, said storage grid being nearer said electron gun, said luminescent screen being further from said electron gun, said luminescent screen and grid being substantially parallel; a pulser electrically connected between said storage grid and said cathode, said pulser supplying erasing pulses to said storage grid when said electron gun operates as an erasing gun; and a cyclically varying voltage source electrically connected between said luminescent screen and said cathode, said cyclically varying voltage source generating a cyclically varying voltage having a period equal to that of said erasing pulses, said cyclically varying voltage containing alternate positive and negative peaks, said negative peaks being coincident with said erasing pulses.

4. The direct view storage tube of claim 3 wherein said cathode is substantially at zero potential and said erasing pulses have a pulse repetition rate of 1000 pulses per second, a pulse length of two microseconds, and pulse amplitude of five volts.

5. A direct view storage tube comprising an electron gun operating as a flood gun; a luminescent screen; a storage grid adjacent said luminescent screen and substantially parallel thereto, said luminescent screen and said storage grid being substantially perpendicular to the longitudinal axis of said electron gun, said storage grid being closer to said flood gun than said luminescent screen; a pulser connected between said storage grid and ground for supplying erasing pulses; and a luminescent screen power supply having a cyclically varying voltage superimposed thereon connected between said luminescent screen and ground, said cyclically varying voltage having a frequency equal to the pulse repetition frequency of said erasing pulses, said cyclically varying voltage source generating a cyclically varying voltage adjusted in phase so that the most negative portions of said cyclically varying voltage are coincident in time with said erasing pulses.

6. A direct view storage tube comprising an electron gun operating as a flood gun; a luminescent screen; a storage grid adjacent to said luminescent screen and substantially parallel thereto, said storage grid being nearer to said flood gun than said luminescent screen; a pulser connected between said storage grid and ground; said pulser supplying positive erasing pulses; and a luminescent screen voltage source connected between said luminescent screen and ground; said luminescent screen voltage source having a cyclically varying voltage swinging to near zero voltage during each positive erasing pulse.

7. A direct view storage tube comprising an electron gun operating as a flood gun; a luminescent screen; a storage grid adjacent said luminescent screen and substantially parallel thereto, said storage grid being closer to said flood gun than said luminescent screen; a pulser connected between said storage grid and ground, said pulser supplying erasing pulses; and a luminescent screen power supply having superimposed thereon a sinusoidal ripple voltage, said luminescent screen power supply being connected between said luminescent screen and ground, said sinusoidal ripple voltage having a ripple frequency equal to said erasing pulse repetition frequency, said sinusoidal ripple voltage being adjusted in phase so that it will be at its most negative value each time an erasing pulse occurs.

8. In a direct view storage tube having at least a storage grid and a luminescent screen, a pulser connected between said storage grid and ground, said pulser supplying erasing pulses, and means comprising a cyclically varying voltage source connected between said luminescent screen and ground, the output of said cyclically varying voltage source having a period substantially equal to that of said erasing pulses and being adjusted in phase so that the most negative portions are substantially coincident in time with said erasing pulses.

References Cited in the file of this patent

UNITED STATES PATENTS

| | | |
|---|---|---|
| 2,790,929 | Herman et al. | Apr. 30, 1957 |
| 2,821,653 | Dyer | Jan. 28, 1958 |